May 22, 1951  J. E. SNYDER  2,554,157
PACKAGE
Filed July 26, 1948

Inventor
JAMES E. SNYDER
By R. H. Waters
Attorney

Patented May 22, 1951

2,554,157

UNITED STATES PATENT OFFICE 2,554,157

PACKAGE

James E. Snyder, Akron, Ohio, assignor to Wingfoot Corporation, Akron, Ohio, a corporation of Delaware Application July 26, 1948, Serial No. 40,659

1 Claim. (Cl. 229—55)

This invention relates to a new bag structure in which the walls are each at least two plies thick. In each wall, at least two of the plies are so composed that, although individually heat-sealable, they do not form a strong bond when heated in pressure contact with one another.

If the bags are double-walled, the edges of the outer wrapping material protrude at the mouth of the bag beyond the edges of the inner wrapping material, and the respective materials are heat-sealed to themselves. The bond of the outer material engages the bond of the inner material and prevents the bag of the inner material from slipping out of the bag of the outer material. If there is more than one seam between the respective wrapping materials at the mouth of the bag there may be a plurality of such bonds between the outer material which engage bonds of the inner material and hold the inner bag in place. If there are more than two plies in the walls of the bag there will be at least one such bond of outer material engaging a bond of inner material to prevent an inner bag slipping out of an outer bag. Ordinarily the walls will be no thicker than two plies and the invention will be more particularly described with reference to such a structure.

There are various heat-sealable wrapping materials on the market, such as rubber hydrochloride film, film of copolymer of vinyl chloride and vinylidine chloride, polyethylene film, coated cellophane, (regenerated cellulose) coated metal foils, etc. Such wrapping materials, although readily heat-sealable to themselves, do not form a good bond when brought into heated pressure contact with one another. Thus, although two plies of rubber hydrochloride film may readily be sealed to one another if pressed together at an elevated temperature, and similarly, two plies of coated cellophane may similarly be heat-sealed together, rubber hydrochloride film does not form a good bond when brought into heated pressure contact with coated cellophane.

The invention will be further described in connection with the accompanying drawings.

Although the invention is described more particularly with respect to bags made of rubber hydrochloride film and coated cellophane, it is to be understood that the bags of this invention may be formed of other heat-sealable wrapping materials which are each heat-sealable to themselves (i. e., they are homo-heat-sealable) but are not heat-sealable to one another (i. e., they are not hetero-heat-sealable). The coated cellophane referred to herein is cellophane coated with a heat-sealable coating.

Figure 1:
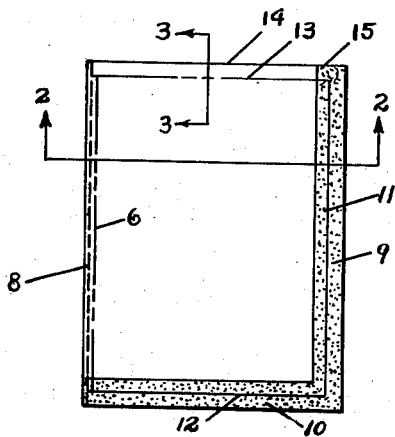
Fig. 1 is a plan view of a bag made of two plies of plastic wrapping material having different heat-sealing properties.

Fig. 1 illustrates a bag made from two sheets of wrapping material by folding the sheets at the left edge of the bag. The inner sheet 5 is rubber hydrochloride film and is folded along the line 6. The outer sheet 7 is coated cellophane and is folded at the line 8. The outer sheet 7 extends beyond the inner sheet along the right-hand side at 9 and along the bottom at 10. The edges of the inner sheet extend only to the line 11 along the side and only to the line 12 at the bottom. Similarly, at the top the inner sheet extends only to the line 13, whereas the outer sheet extends to the line 14. The sheets are united along the right-hand side and bottom edges in the stippled areas by a single application of heat and pressure. This produces an area 15 of the bonded outer sheet which engages the bond formed by union of the edges of the inner sheet. This sealed area 15 holds the inner bag in place and prevents it from slipping out of the outer bag.

In some cases the simultaneous sealing of two sheets results in enough cling between the dissimilar materials to prevent the inner bag from slipping out of the outer bag without the aid of the bonded area 15, but in all such cases the bonded area 15 gives assurance of non-separation of the component parts of the bag.

Many factors influence the position of the two or more sheets used in the walls of the bag. In general, it is desirable to place on the outside the material with the higher sealing temperature. Also, generally speaking, the material that forms the strongest bond should go on the inside. However, such factors are not generally controlling. If one of the wrapping materials is toxic or odorous and the material to be packaged is sensitive to either of these conditions, that will be controlling. Also the nature of the material being packaged and the external conditions to which it is to be subjected must be given careful consideration. For instance, if rubber hydrochloride film and coated cellophane are to be used in the package, sometimes one will be on the outside and sometimes the other. If the material to be packaged is aqueous or contains an aqueous ingredient the cellophane cannot be used inside, but must be used outside. On the other hand, if the material to be packaged is dry, but the package may come in contact with water the cellophane must be used on the inside. If the product and the external conditions are such that either ply may be used on the inside or outside it is advantageous to place the cellophane on the outside, because in sealing the cellophane a higher temperature may be used than with rubber hydrochloride without melting, thus assuring a better inner seal.

In forming a bag with the rubber hydrochloride on the inside, as illustrated, the rubber hydrochloride sheet will be smaller than the sheet of coated cellophane. The sheet of the cellophane extends beyond the edge of the rubber hydrochloride film on all four sides. The two plies of film are then doubled along the middle, along the lines 6 and 8 respectively. Then by a hot iron or other hot sealing instrument the bottom and side are heated over the stippled areas. Thus, the rubber hydrochloride film is sealed to itself inside the coated cellophane which is simultaneously sealed to itself outside the rubber hydrochloride film, although coated cellophane cannot be sealed to rubber hydrochloride film to form a satisfactory bond.

Figure 2:
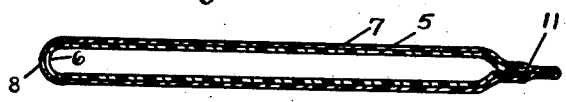
Fig. 2 is an enlarged section on the line 2—2 of Fig. 1.
Figure 3:
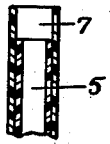
Fig. 3 is an enlarged section on the line 3—3 of Fig. 1.

The resulting bag, as illustrated in Figs. 1 to 3, is very satisfactory for the packaging of a great variety of materials. When the bag is filled it may be sealed across the top by a wide heat-seal which lies on both sides of the edge 13 of the inner film. The inner surface of the bag possesses all of the advantages of a bag of rubber hydrochloride film, and the outer surface possesses all the advantages of a bag of coated cellophane. By selection of films, bag structures are obtainable, having a variety of packaging and keeping properties.

Figure 4:
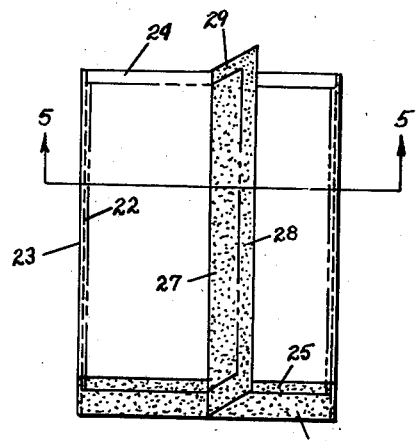
Fig. 4 is a plan view of a bag of different construction.
Figure 5:
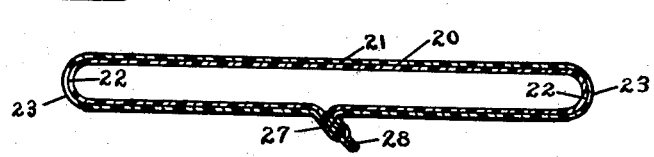
Fig. 5 is an enlarged section on the line 5—5 of Fig. 4.

The bag need not be formed by doubling the two sheets. Instead, the sheets may be folded at about a quarter of their width from each edge, forming the type of bag illustrated in Figs. 4 and 5. Here the inner sheet 20 and outer sheet 21 are folded at 22 and 23 respectively. The outer sheet protrudes beyond the inner sheet at 24 at the mouth of the bag. The sheets are sealed to themselves simultaneously in the stippled areas 25 and 26 at the bottom of the bag and in the stippled areas 27 and 28 in the middle of the side, the reference numerals indicating the bonds of the inner and outer sheets, respectively. The bond 29 of the protruding outer sheet at the mouth of the bag engages the bond 27 of the inner sheet lying inwardly of it, and holds the inner bag in place.

Figure 6:
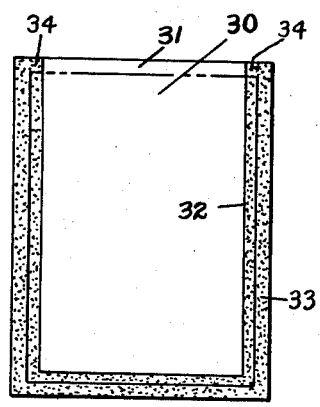
Figs. 6 and 7 are plan views of bags of still different constructions.

Fig. 6 illustrates a different bag construction in which two smaller sheets of rubber hydrochloride film 30 are placed within two larger sheets of coated cellophane 31, the edges of the rubber hydrochloride film coinciding and the edges of the coated cellophane coinciding. Both side edges of the sheets and the bottoms of the sheets are then sealed over the areas indicated by stippling, the numeral 32 indicating the bond of the inner sheet and the numerals 33 the bond of the outer sheet. Thus the two plies of rubber hydrochloride film are united to one another at the same time the two plies of coated cellophane are united to one another. The seals 34 of the coated cellophane engage the seals 32 of the rubber hydrochloride film at each side of the finished bag and keep the bag of rubber hydrochloride film from slipping out of the outer bag of coated cellophane.

Figures 7, 8:
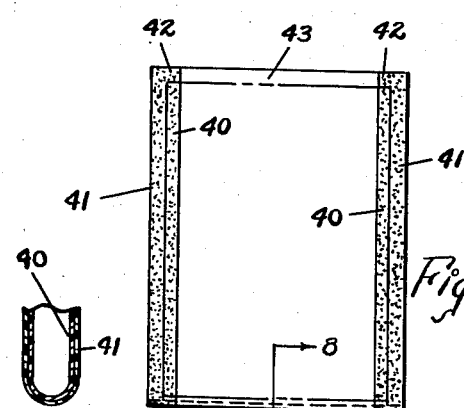
Fig. 8 is a section on the line 8—8 of Fig. 7.

The bag shown in Figs. 7 and 8 resembles somewhat the bag shown in Fig. 1 because both bags are made from but two plies of material and in the construction of both bags the plies are doubled along their centerline. In the bag of Figs. 7 and 8, instead of heat-sealing along adjoining edges, as illustrated in Fig. 1, the opposite edges of the big are sealed. The stippled areas 40 illustrate the heat-seal of the hubber-hydrochloride film and the stippled areas 41 illustrate the seal of the coated cellophane. The seal of the coating on the cellophane extends inwardly over the rubber hydrochloride seals at both sides of the top of the bag at 42, thus preventing the inner bag from being displaced from the outer bag. The outer sheet protrudes beyond the inner sheet at 43 across the top of the bag to permit sealing the sheets to themselves by a single seal, to close the bag after filling.

Although in the drawings the edge of the inner sheet at the mouth of the big is shown as perfectly straight, modifications within the scope of this invention include the use of a sheet with an edge that is not straight. For example, if the top edge of the inner sheet in Fig. 7 slopes downwardly over the heat-sealed areas 40 the inner bag is held more securely within the outer bag than if the top edge of the inner sheet is perfectly straight.

There are many constructions in which it is desirable to use wrapping materials of different composition. For example, different wrapping materials are impervious to different gases and vapors. A combination of two films gives protection not obtained by two plies of film of the same composition. Furthermore, different materials have different strengths, different solubilities, and their other physical properties differ. For example, one may combine an inner ply of a material with desirable solvent properties, with an outer ply of a material having desirable abrasion-resisting properties or desirable strength. A great variety of bag structures is thus made possible.

What I claim is:

An empty and open double-walled bag, each wall being composed of different wrapping materials, the respective materials being homo-heat-sealable but not hetero-heat-sealable, and at the end of a seam of the respective materials leading to the mouth of the bag a heat-sealed area of the outer wrapping material protruding beyond the seam between edges of the inner wrapping material in both the direction of the mouth of the bag and the direction of the outer edge of the seam, the seal of the outer material engaging the seal of the inner material at the end of the seam so as to prevent the bag element of the inner material from slipping out of the bag element of the outer material.

JAMES E. SNYDER.

REFERENCES CITED

The following references are of record in the file of this patent:

UNITED STATES PATENTS

| Number | Name | Date |
|---|---|---|
| 1,128,904 | Belcher | Sept. 6, 1938 |
| 2,176,499 | Hoppe et al. | Oct. 17, 1939 |
| 2,177,894 | Lakso | Oct. 31, 1939 |
| 2,234,065 | Vogt | Mar. 4, 1941 |
| 2,254,510 | Bergstein | Sept. 2, 1941 |
| 2,257,823 | Stokes | Oct. 7, 1941 |
| 2,298,522 | Waters | Oct. 13, 1942 |